(12) United States Patent
Katariya et al.

(10) Patent No.: US 6,473,753 B1
(45) Date of Patent: Oct. 29, 2002

(54) METHOD AND SYSTEM FOR CALCULATING TERM-DOCUMENT IMPORTANCE

(75) Inventors: Sanjeev Katariya, Issaquah; William P. Jones, Kirkland, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/216,085

(22) Filed: Dec. 18, 1998

Related U.S. Application Data

(60) Provisional application No. 60/103,718, filed on Oct. 9, 1998.
(51) Int. Cl.$^7$ .................... G06F 17/30; G06F 17/28; G06F 17/21
(52) U.S. Cl. .................... 707/4; 707/5; 704/2; 704/10
(58) Field of Search ...................... 707/1, 2, 3, 4, 707/5, 6; 704/1, 2, 3, 4, 5, 10

(56) References Cited

U.S. PATENT DOCUMENTS

| | | | |
|---|---|---|---|
| 5,826,260 A | * 10/1998 | Byrd, Jr. et al. | 707/5 |
| 5,845,278 A | * 12/1998 | Kirsch et al. | 707/3 |
| 5,920,859 A | * 7/1999 | Li | 707/5 |
| 5,983,214 A | * 11/1999 | Lang et al. | 707/1 |
| 6,009,382 A | * 12/1999 | Martino et al. | 704/1 |
| 6,012,053 A | * 1/2000 | Pant et al. | 707/3 |
| 6,055,535 A | * 4/2000 | Suzuoka et al. | 707/10 |
| 6,167,397 A | * 12/2000 | Jacobson et al. | 707/5 |
| 6,172,685 B1 | * 1/2001 | Pandit | 345/471 |

OTHER PUBLICATIONS

A Simple Example—Logarithms, Jun. 17, 1997, www-.math.utah.edu/~alfeld/math/sexample.html, pp. 1–2.*

* cited by examiner

*Primary Examiner*—James P. Trammell
*Assistant Examiner*—Mary Wang
(74) *Attorney, Agent, or Firm*—Woodcock Washburn LLP

(57) ABSTRACT

A weighting system for calculating the term-document importance for each term within each document that is part of a collection of documents (i.e., a corpus). The weighting system calculates the importance of a term within a document based on a computed normalized term frequency and a computed inverse document frequency. The computed normalized term frequency is a function, referred to as the "computed term frequency function" ("A"), of a normalized term frequency. The normalized term frequency is the term frequency, which is the number of times that the term occurs in the document, normalized by the total term frequency of the term within all documents, which is the total number of times that the term occurs in all the documents. The weighting system normalizes the term frequency by dividing the term frequency by a function, referred to as the "normalizing term frequency function" ("Γ"), of the total term frequency. The computed inverse document frequency is a function, referred to as the "computed inverse document frequency function" ("B") of the inverse document frequency. The weighting system identifies a computed normalized term frequency function A and a computed inverse document frequency function B so that on average the computed normalized term frequency and the computed inverse document frequency contribute equally to the weight of the terms.

27 Claims, 5 Drawing Sheets

METHOD AND SYSTEM FOR CALCULATING TERM-DOCUMENT IMPORTANCE

CROSS-REFERENCE TO RELATED APPLICATION

This application claims the benefit of pending U.S. Provisional Application No. 60/103,718, filed Oct. 9, 1998, which application is incorporated by reference in its entirety.

TECHNICAL FIELD

This invention relates generally to a computer system for searching for documents, and more specifically to calculating the term-document importance of terms within a collection of documents.

BACKGROUND OF THE INVENTION

The Internet is a collection of interconnected computer systems through which users can access a vast store of information. The information accessible through the Internet is stored in electronic files (i.e., documents) under control of the interconnected computer systems. It has been estimated that over 50 million documents are currently accessible through the Internet and that the number of documents is growing at the rate of 75% per year. Although a wealth of information is stored in these documents, it has been very difficult for users to locate documents relating to a subject of interest. The difficulty arises because documents are stored in many different computer systems, and the Internet provides no central mechanism for registering documents. Thus, a user may not even know of the existence of certain documents, let alone the subject matter of the documents. Each document that is accessible through the Internet is assigned a unique identifier, which is referred to as a uniform resource locator ("URL"). Once a user knows the identifier of a document, the user can access the document. However, even if a user knows the identifiers of all documents accessible through the Internet, the user may not know the subject matter of the document. Thus, the user may have no practical way to locate a document relating to a subject of interest.

Several search engines have been developed to assist users to locate documents relating to a subject of interest. Search engines attempt to locate and index as many of the documents provided by as many computer systems of the Internet as possible. The search engines index the documents by mapping terms that represent the subject matter of each document to the identifier of the document. When using a search engine to locate documents relating to a subject of interest, the user enters search terms that describe the subject of interest. The search engine then searches the index to identify those documents that are most relevant to the search terms. In addition, the search engine may present the search results, that is the list of relevant documents, to the user in order based on the relevance to the search term. The user can then select and display the most relevant documents.

The accuracy of the search results depends upon the accuracy of the indexing used by a search engine. Unfortunately, there is no easy way for a search engine to determine accurately the subject matter of documents. The difficulty in determining the subject matter of a document is compounded by the wide variety of formats (e.g., as a word processing documents or as a hyper-text document) and the complexity of the formats of the documents accessible through the Internet. To make it easier for a search engine to determine the subject matter of a document, some document formats have a "keyword" section that provides words that are representative of the subject matter of the document. Unfortunately, creators of documents often fill the "keyword" section with words that do not accurately represent the subject matter of the document using what is referred to as "false promoting" or "spamming." For example, a creator of a classified advertising web page for automobiles that may fill the "keyword" section with repetitions of the word "car." The creator does this so that a search engine will identify that web page as very relevant whenever a user searches for the term "car." However, a "keyword" section that more accurately represents the subject matter of the web page may include the words "automobile," "car," "classified," "for," and "sale."

Because the document formats have no reliable way to identify the subject matter of a document, search engines use various algorithms to determine the actual subject matter of documents. Such algorithms may generate a numerical value for each term in a document that rates importance of the term within the document. For example, if the term "car" occurs in a document more times than any other term, then the algorithm may give a high numerical value to the term "car" for that document. Typical algorithms used to rate the importance of a term within a document often factor in not only the frequency of the occurrence of term within the document, but also the number of documents that contain that term. For example, if a term occurs two times in a certain document and also occurs in many other documents, then the importance of that term to the document may be relatively low. However, if the term occurs two times in that document, but occurs in no other documents, then the importance of that term within the document may be relatively high even though the term occurs only two times in the document. In general, these algorithms attempt to provide a high "information score" to the terms that best represent the subject matter of a document with respect to both the document itself and to the collection of documents.

To calculate the importance or "information score," typical algorithms take into consideration what is referred to as the term frequency within a document and the document frequency. The term frequency of a term is the number of times that the term occurs in the document. The term frequency for term i within document j is represented as $TF_{ij}$. The document frequency of a term is the number of documents in which the term occurs. The document frequency for term i is represented as $n_i$. One such algorithm uses the Salton Buckley formula for calculating the importance of terms. The formula is given by the following equation:

$$W_{ij} = \log_2 TF_{ij} * \log_2 \frac{N}{n_i} \tag{1}$$

where $W_{ij}$ is the numerical value (i.e., weight) of the importance of the term i to the document j, where $TF_{ij}$ is the term frequency, where $n_i$ is the document frequency, and where N is the total number of documents in a collection of documents. The quotient $N/n_i$ is referred to as the inverse document frequency, which is the inverse of the ratio of the number of documents that contain the term to the total number of documents. As the term frequency increases, the weight calculated by this formula increases logarithmically. That is, as the term occurs more frequently in a document, the weight of that term within the document increases. Also, as the document frequency increases, the weight decreases logarithmically. That is, as a term occurs in more documents, the weight of the term decreases. It is, of course, desirable to use a formula that results in weights that most accurately reflect the importance or information score of terms.

SUMMARY OF THE INVENTION

An embodiment of the present invention provides a weighting system for calculating the weight for a term within one document in a collection of documents. The weighting system first generates a term frequency that represents the number of times that the term occurs in the one document. The weighting system also generates a total term frequency that represents a total number of times the term occurs in the collection of documents. The weighting system then calculates a normalized term frequency by factoring the generated term frequency by a normalizing function of the generated total term frequency. The weighting system combines the calculated normalized term frequency with a document frequency to generate the weight for the term. In one embodiment, the normalizing function is a function that is based on the square root of the generated total term frequency. In another embodiment, the normalizing function is a function that is based on a logarithm of the generated total term frequency. The weighting system also may use various different algorithms for generating an improved term frequency that more accurately represents the importance of a term. In one embodiment, the weighting system uses various factors, such as the formatting (e.g., italics) of a term and the number of unique terms within the document, to generate the improved term frequency.

In another embodiment, the weighting system identifies a formula for weighting terms within a collection of documents. The weighting system generates an average term frequency that represents an average of term frequencies for each term within each document. The term frequency is the number of times that a term occurs in a document. The weighting system then generates an average inverse document frequency that represents an average of inverse document frequencies for each term. The inverse document frequency of a term is the number of documents in the collection divided by the number of documents in which the term occurs. The weighting system then identifies a first function of the generated average term frequency and a second function of the generated average inverse document frequency so that the first function of the generated average term frequency is approximately equal to the second function of the generated average inverse document frequency. In one embodiment, the first and second functions are logarithmic, and the weighting system identifies bases for each function to achieve the equality.

DETAILED DESCRIPTION OF THE INVENTION

Figure 1:
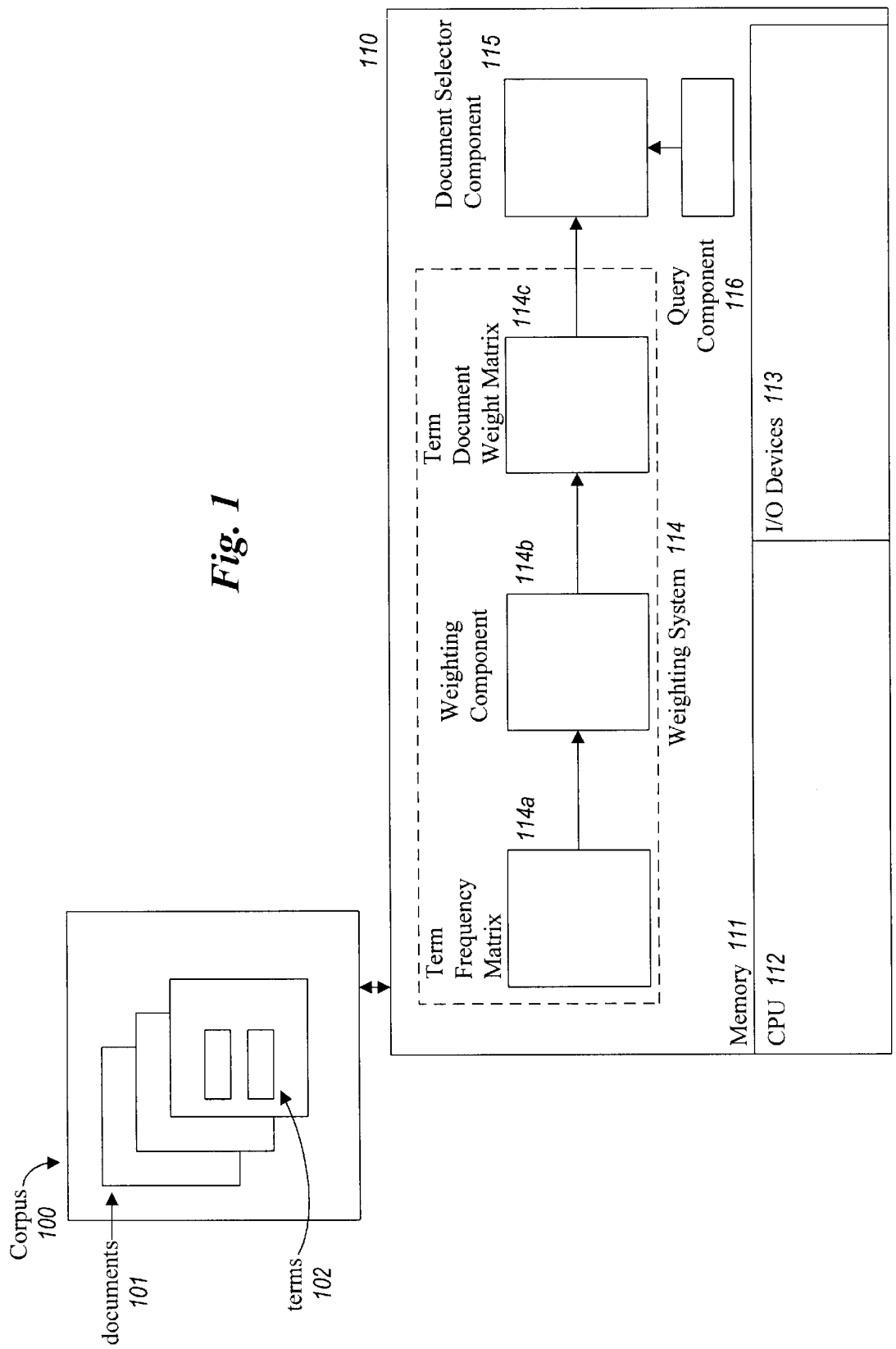
FIG. 1 is a block diagram of a computer system for executing the weighting system.

An embodiment of the present invention provides a weighting system for calculating the term-document importance for each term within each document that is part of a collection of documents (i.e., a corpus). The weighting system calculates the importance of a term within a document based on a computed normalized term frequency and a computed inverse document frequency. The computed normalized term frequency is a function, referred to as the "computed normalized term frequency function" ("A"), of a normalized term frequency. The normalized term frequency is the term frequency, which is the number of times that the term occurs in the document, normalized by the total term frequency of the term within all documents, which is the total number of times that the term occurs in all the documents. The weighting system normalizes the term frequency by dividing the term frequency by a function, referred to as the "normalizing term frequency function" ("Γ"), of the total term frequency. The computed inverse document frequency is a function, referred to as the "computed inverse document frequency function" ("B") of the inverse document frequency. Thus, the importance of a term within a document is represented by the following equation:

$$W_{ij} = A\left(\frac{TF_{ij}}{\Gamma(TF_i)}\right) * B\left(\frac{N}{n_i}\right)$$

where $W_{ij}$ represents the importance of term i within document j, where $TF_{ij}$ represents the term frequency for term i within document j, where $TF_i$ represents the total term frequency for term i, where $n_i$ represents the number of documents that contain term i, and N represents the number of documents. The selection of the various functions that are used by the weighting system are made to improve the accuracy of the importance calculation.

In one embodiment, the normalizing term frequency function Γ is the inverse of the square root of the total term frequency. Therefore, as a term increasingly occurs in the corpus, the influence of the term frequency in the importance calculation is reduced by a factor that is the square root of the number of occurrences. That is, if the term occurs 16 times throughout the corpus, then the term frequency is reduced by the factor of 4, which is the square root of 16. However, if the term occurs 64 times throughout the corpus, then the factor is 8, which is the square root of 64. In an alternate embodiment, the normalizing term frequency function Γ is a logarithmic function of the total term frequency. Therefore, as a term increasingly occurs in the corpus, the influence of the term frequency in the importance calculation is reduced by a factor that is a logarithm of the total term frequency. That is, if the term occurs 16 times throughout the corpus, then the term frequency is reduced by a factor of 4, which is the logarithm (base 2) of 16. However, if the term occurs 64 times throughout the corpus, then the factor is 6, which is the logarithm (base 2) of 64. In one embodiment, the weighting system uses a logarithmic function for both the computed normalized term frequency function A and the computed inverse document frequency function B.

A goal of the weighting system is to derive the term-document importance by giving equal weight to the computed normalized term frequency and the computed inverse document frequency. To achieve this equal weighting, the weighting system in one embodiment uses different bases for the logarithm of the computed normalized term frequency function A and the computed inverse document frequency function B. Traditional algorithms have used the same bases for the logarithmic function of the term frequency and the inverse document frequency. However, with such traditional logarithmic functions, the term frequency and inverse document frequency do not in general contribute equally to the calculation of importance. For example, if a corpus contains closely-related documents, then most terms will occur in most of the documents and the influence of inverse document frequency will be about the same for each term. As a result, the influence of term frequency on the calculation of the importance will be much greater than that of the inverse document frequency. To equalize the influence, the weighting system calculates the bases for the computed normalized term frequency function A and the computed inverse document frequency function B based on the average term frequencies and the average document frequencies throughout the corpus. By computing the bases for the logarithms, the weighting system ensures that on average, the computed normalized term frequency and the computed inverse document frequency contribute equally to the calculated importance of the terms. In one embodiment, the weighting system also calculates the base for the logarithmic-version of the normalizing term frequency function $\Gamma$. The base is calculated so that the upper limit of the effect of the normalizing term frequency function $\Gamma$ is the average term frequency.

The weighting system also provides various techniques for generating a term frequency that is a more accurate representation of the importance of a term than the number of occurrences of the term within the document. Such generated term frequencies are referred to as improved term frequencies. When generating an improved term frequency, the weighting system takes into consideration factors such as formatting (e.g., italics) of the term within the document, the number of unique terms within the document, and whether the term is displayed when the document is displayed. The various improved term frequencies can be used in place of the term frequency when calculating the weight of a term.

FIG. 1 is a block diagram of a computer system for executing the weighting system. The computer system 110 includes a memory 111, central processing unit 112, and various I/O devices 113. The input/output devices may include a monitor, keyboard, and storage devices. The storage devices may include a disk, a CD-ROM, or other computer-readable media. The computer system 110 can access the corpus 100 of documents that may be contained on a storage device directly connected to the computer or on storage devices of other computer systems. The corpus contains documents 101 and each document comprises one or more terms 102. The weighting system 114 comprises a term frequency matrix 114a, a weighting component 114b, and a term-document weight matrix 114c. The term frequency matrix maps each term to the number of times that it occurs in each document. Thus, the number of rows in the term frequency matrix is equal to the number of unique terms ("M") in the corpus, and the number of columns in the matrix is equal to the number of documents ("N") in the corpus. The term frequency matrix can be pre-generated or generated by the weighting system by searching through the corpus. The weighting component determines the term-document importance (weight) of each term within each document. The weighting component inputs the term frequency matrix and generates the term-document weight matrix. The term-document weight matrix is the same size as the term frequency matrix and has a row for each unique term in the corpus and a column for each document in the corpus. The term-document weight matrix contains the term-document weight for each term within each document. One skilled in the art will appreciate that the matrices can be stored using various compaction techniques. For example, the term-document weight matrix could store only those weights above a certain threshold level. The document selector component 115 inputs a search term from the query component 116 and identifies those documents whose term-document weight for that search term is highest as indicated by the term-document weight matrix.

Figure 2:
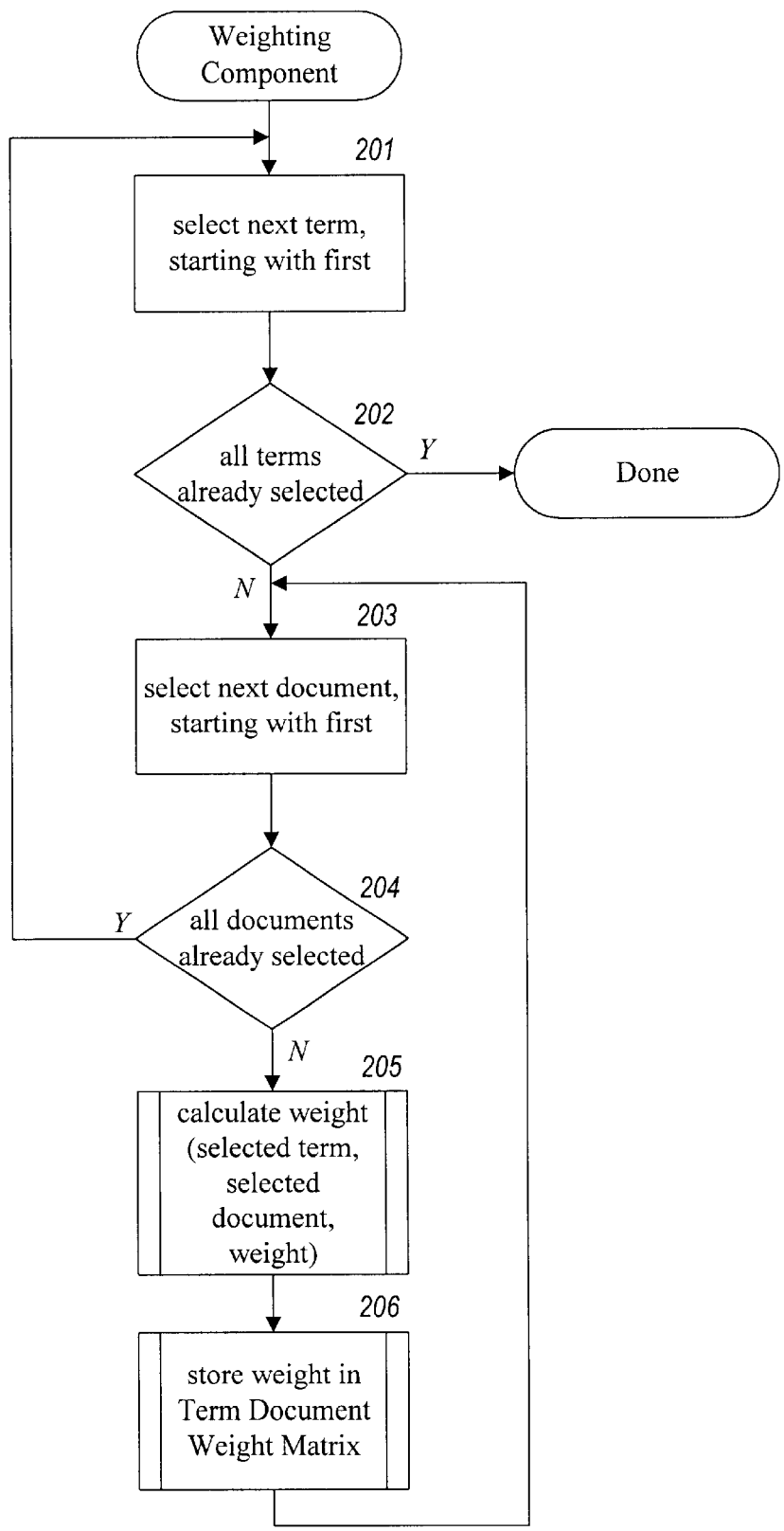
FIG. 2 is a flow diagram of the weighting component.

FIG. 2 is a flow diagram of the weighting component. The weighting component selects each term and each document and calculates the weight for the selected term and document. The weighting component stores the calculated weights in the term-document weight matrix. The formulas used to calculate the weight are described below in detail. In steps 201–206, the weighting component loops selecting each unique term i in the corpus. In step 201, the component selects the next term starting with the first. In step 202, if all the terms have already been selected, then the component is done, else the component continues at step 203. In steps 203–206, the component loops selecting each document j for the selected term. In step 203, the component selects the next document starting with the first. In step 204, if all the documents have already been selected for the selected term, then the component loops to step 201 to select the next term, else the component continues at step 205. In step 205, the component calculates the weight for the selected term within the selected document. In step 206, the component stores the calculated weight in the term-document weight matrix indexed by the selected term and document. The component then loops to step 203 to select the next document for the selected term.

Figure 3:
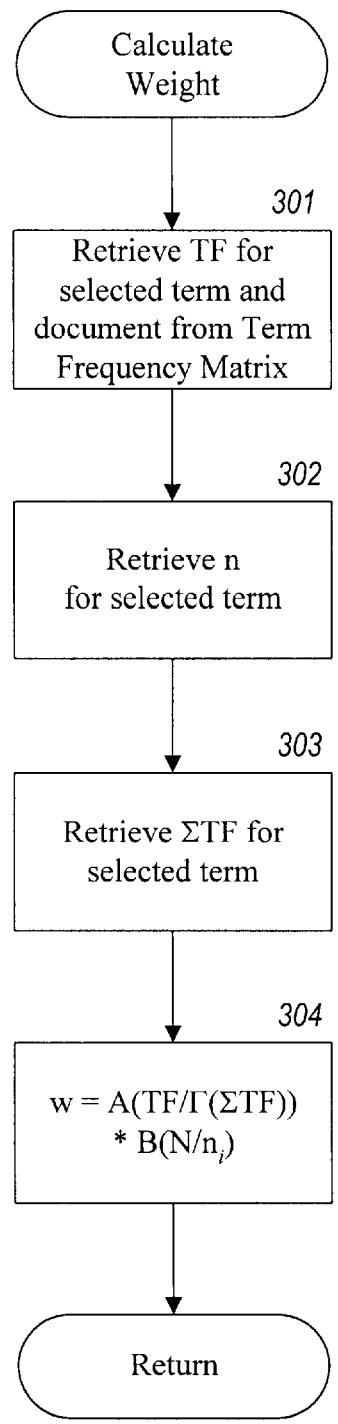
FIG. 3 is a flow diagram of a routine to calculate the weight of a term.

FIG. 3 is a flow diagram of a routine to calculate the weight of a term. This routine is passed an indication of the selected term and the selected document and returns the calculated weight. In step 301, the routine retrieves the term frequency $TF_{ij}$ for the selected term i and the selected document j from the term frequency matrix. In step 302, the routine retrieves the number of documents $n_i$ in which the selected term occurs. The number of documents can be calculated by counting the number non-zero entries in the row corresponding to the selected term of the term frequency matrix. In step 303, the routine retrieves the number of occurrences of the term throughout the corpus. The number can be calculated by totaling the number of occurrences in each entry in the row for the selected term. In step 304, the routine calculates the weight to be a combination of the computed normalized term frequency function A and the computed inverse document frequency function B and then returns.

Figure 4:
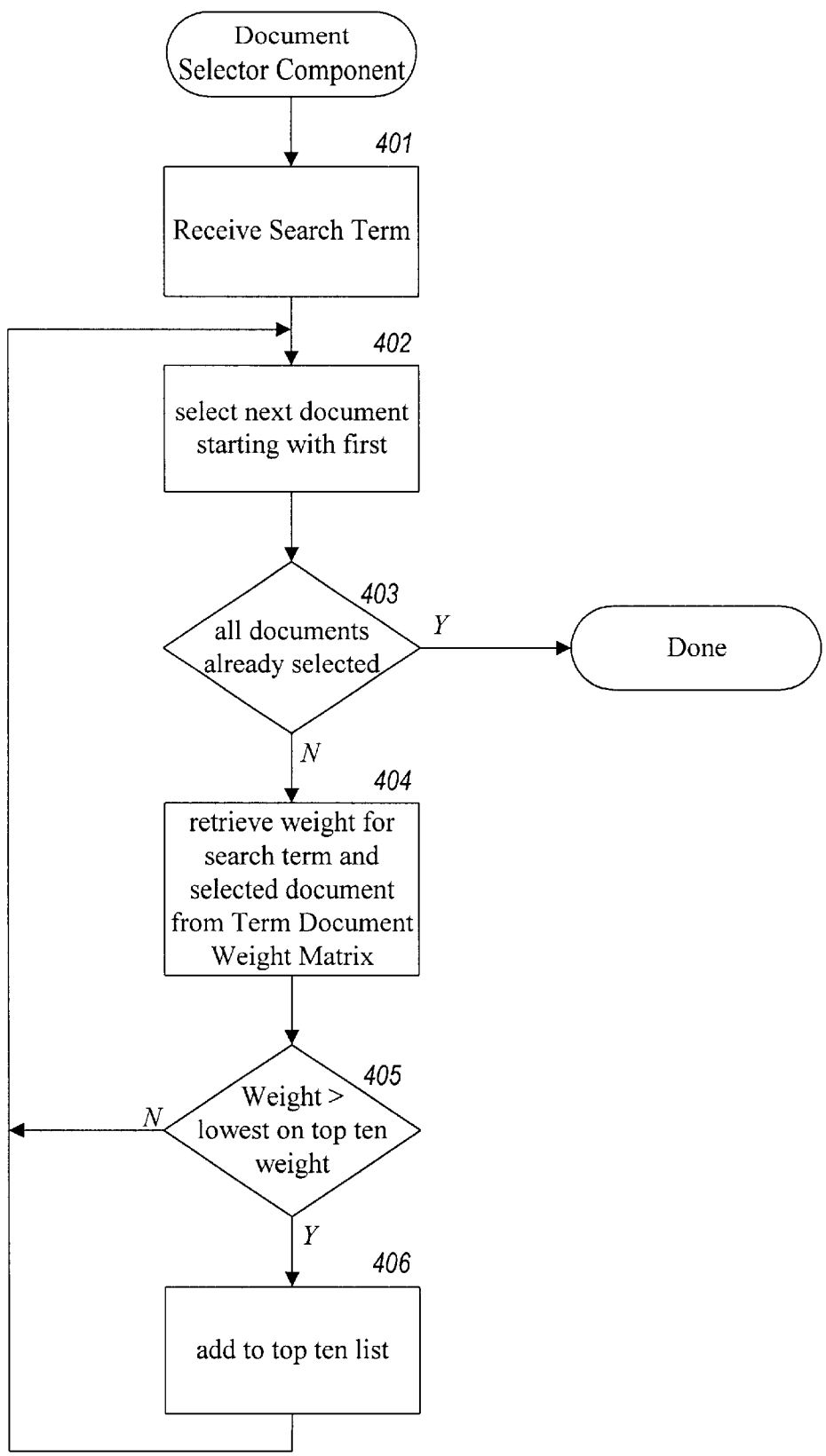
FIG. 4 is a flow diagram of the document selector component.

FIG. 4 is a flow diagram of the document selector component. The document selector component receives a search term from a query and selects the documents whose weights are highest for that term. In one embodiment, this component generates a top 10 list of the documents with the highest weights. In step 401, a component receives the search term. In steps 402–406, the component loops selecting the documents and determining the weight for the search term for that document. In step 402, the component selects the next document starting with the first document. In step 403, if all the documents have already been selected, then the component completes, else the component continues at step 404. In step 404, the component retrieves the weight for the search term and the selected document from the term-document weight matrix. In step 405, if the retrieved weight is greater than the lowest weight in the current top 10 list, then the component continues at step 406, else the component loops to step 402 to select the next document. In step 406, the component adds the selected document to the top 10 list and loops to step 402 to select the next document.

Weighting Formula

The weighting system calculates the weight of a document for a term that is based on the term frequency and the inverted document frequency. The calculation of the weight W is represented by the following equation:

$$W_{ij} = CNTF_{ij} * CIDF_i \quad (2.1)$$

where $W_{ij}$ is the weight for term i and document j, where $CNTF_{ij}$ is the computed normalized term frequency as described below for term i and documents, and $CIDF_i$ is the computed inverse document frequency as described below for term i.

The computed inverse document frequency is derived by applying the computed inverse document frequency function B to the inverse document frequency. In one embodiment, the computed inverse document frequency function B is a logarithmic function given by the following equation:

$$CIDF_i = B\left(\frac{N}{n_i}\right) = \log_\beta \frac{N}{n_i} \quad (2.2)$$

where N is the number of documents in the corpus, where $n_i$ is the number of documents that contain the term i, and where $\beta$ is the base of the logarithm.

The computed term frequency is derived by applying the computed normalized term frequency function A to the results of applying the normalizing term frequency function $\Gamma$ to the total term frequency. In one embodiment, the computed term frequency function A is the logarithmic function given by the following equation:

$$CNTF_{ij} = A\left(\frac{TF_{ij}}{\Gamma(TF_i)}\right) = \log_\alpha\left((\alpha - 1) + \frac{TF_{ij}}{\Gamma(TF_i)}\right) \quad (2.3)$$

where $\alpha$ is the base of the logarithm. The normalized term frequency $NTF_{ij}$ for the term i within documents is given by the following equation:

$$NTF_{ij} = \frac{TF_{ij}}{\Gamma(TF_i)} \quad (2.4)$$

As discussed above, the normalizing term frequency function $\Gamma$ is either based on the square root of the total term frequencies or a logarithm of the total term frequencies. A square root based normalizing term frequency function $\Gamma$ is given by the following equation:

$$\Gamma(TF_i) = \left(1 + \sum_{k=1}^{n_i} TF_{ik}\right)^{1/2} \quad (2.5)$$

One skilled in the art would appreciate that roots (i.e., powers between 0 and 1) other than the square root can be used (e.g., cube root). A logarithmic-based normalizing term frequency function is given by the following equation:

$$\Gamma(TF_i) = \log_\gamma\left((\gamma - 1) + \sum_{k=1}^{n_i} TF_{ik}\right) \quad (2.6)$$

where $\gamma$ is the base of the logarithm. The weighting system preferably uses a square root or logarithmic based normalizing term frequency function. Since the square root of a number is in general larger than the logarithm of a number (at least as the number approaches infinity), a square root function tends to lower the contribution of the term frequency to the weight as compared to a logarithmic function.

Calculation of Base $\beta$

The weighting system attempts to equalize the contribution of the computed normalized term frequency and the computed inverse document frequency to the calculation of the weight. The base $\beta$ of the computed inverted document frequency function is selected based on the change in the number of documents in which a term occurs that is desired to change the value of the computed inverse document frequency by 1. For example, if a factor of 10 change in the number of documents is desired to change the computed inverse document frequency by I, then base $\beta$ should be 10. Assuming a corpus of 10 million documents and base $\beta$ of 10, and assuming that a term occurs in 100 documents, then the computed inverted document frequency will be the logarithm base 10 of 10 million divided by 100, which is 5. However, if the term occurs in 1000 documents, then the computed inverse document frequency will be 4. If the corpus is relatively small (e.g., 1000 documents), then the base $\beta$ may be selected to be small so that the computed inverse document frequency can vary over a large range. For example, if there are 1000 documents in a corpus, and base $\beta$ is 10, then the computed inverse document frequency ranges only from 0–3. However, if the base $\beta$ is 2, then the computed inverse document frequency ranges from 0–10.

Calculation of Base $\alpha$

Once the base $\beta$ is selected, the weighting system selects the base $\alpha$ so that the computed normalized term frequency and the computed inverse document frequency on average contribute an equally to the weight. The average term frequency $aTF_j$ for documents is given by the following equation:

$$aTF_j = \frac{\sum_{i=1}^{M_j} TF_{ij}}{M_j} \quad (3.1)$$

where $M_j$ is the number of terms in document j. The average term frequency aTF across all documents is given by the following equation:

$$aTF = \frac{\sum_{j=1}^{N} aTF_j}{N} \quad (3.2)$$

The average number of documents in which a term occurs an is given by the following equation:

$$an = \frac{\sum_{i=1}^{M} n_i}{M} \quad (3.3)$$

where M is the number of terms in the corpus. The average computed inverse document frequency is thus given by the following equation:

$$aCIDF = \log_\beta \frac{N}{an} \quad (3.4)$$

The average computed normalized term frequency is given by the following equation:

$$aCNTF = \log_\alpha\left((\alpha - 1) + \frac{aTF}{\Gamma(aTF)}\right) \quad (3.5)$$

The value of the base $\alpha$ and base $\beta$ are determined for when the average computed inverse document frequency equals the average computed normalized term frequency as provided by the following equation:

$$\log_\beta \frac{N}{an} = \log_\alpha\left((\alpha - 1) + \frac{aTF}{\Gamma(\Sigma aTF)}\right) \quad (3.6)$$

where $\Sigma aTF$ represents the total term frequency based on the average term frequency. Equation (3.6) can be solved for the various possible normalizing term frequency functions $\Gamma$.

Calculation of Base $\alpha$ for the Salton Buckley Formula

The Salton Buckley formula would use a normalizing term frequency function $\Gamma$ given by the following equation:

$$\Gamma(\Sigma aTF) = 1 \quad (4.1)$$

The result of such an equation is that normalization does not occur. When this function is inserted into the equation for the average computed normalized term frequency results in the following equation:

$$\alpha CNTF = \log_\alpha((\alpha - 1) + aTF) \quad (4.2)$$

This equation can be represented using logarithms of base $\beta$ as given by the following equation:

$$aCNTF = \frac{\log_\beta(1 + aTF)}{\log_\beta \alpha} \quad (4.3)$$

assuming that $\alpha << aTF$. When the average computed inverse document frequency is set equal to the average computed normalized term frequency, it results in the following equation:

$$\log_\beta \frac{N}{an} = \frac{\log_\beta(1 + aTF)}{\log_\beta \alpha} \quad (4.4)$$

The solution for base a is given by the following equation:

$$\alpha = \left|\beta\left(\frac{\log_\beta(1 + aTF)}{\log_\beta \frac{N}{an}}\right)\right| \quad (4.5)$$

Calculation of Base $\alpha$ for the Square Root Function

When the normalizing term frequency function $\Gamma$ is a square root function of equation (2.5), the solution for base a is given by the following equation:

$$\alpha = \left|\beta\left(\frac{\log_\beta(\beta - 1 + aTF * (1 + an * aTF)^{-1/2})}{\log_\beta \frac{N}{an}}\right)\right| \quad (5)$$

Base $\alpha$ for the Logarithmic Function

When the normalizing term frequency function $\Gamma$ is a logarithmic function, the solution for base a is given by the following equation:

$$\alpha = \left|\beta\left(\frac{\log_\beta(\beta - 1 + aTF * (\log_\gamma(\gamma - 1 + an * aTF))^{-1})}{\log_\beta \frac{N}{an}}\right)\right| \quad (6)$$

Calculation of Base $\gamma$ for the Logarithmic Function

The weighting system sets the base $\gamma$ so that the upper limit of the effect of the normalizing term frequency function $\Gamma$ is equal to the average term frequency. In addition, the weighting system approximates the total term frequency for the term i as the product of the average term frequency for all terms times the average document frequency for all terms. This approximation is given by the following equation:

$$\sum_{k=1}^{n_i} TF_{ik} \cong aTF * an \quad (7.1)$$

The weighting system also assumes that the value of $\gamma - 1$ is much less than the average total of the term frequency as represented by the following equation:

$$\gamma - 1 << aTF * an \quad (7.2)$$

The upper limit of the total term frequency function is the average term frequency as shown by the following equation:

$$\log_\gamma(aTF * an) = aTF \quad (7.3)$$

The solution for the base y is given by the following equation:

$$\gamma = \left[(aTF * an)^{\frac{1}{aTF}}\right] \quad (7.4)$$

Figure 5:
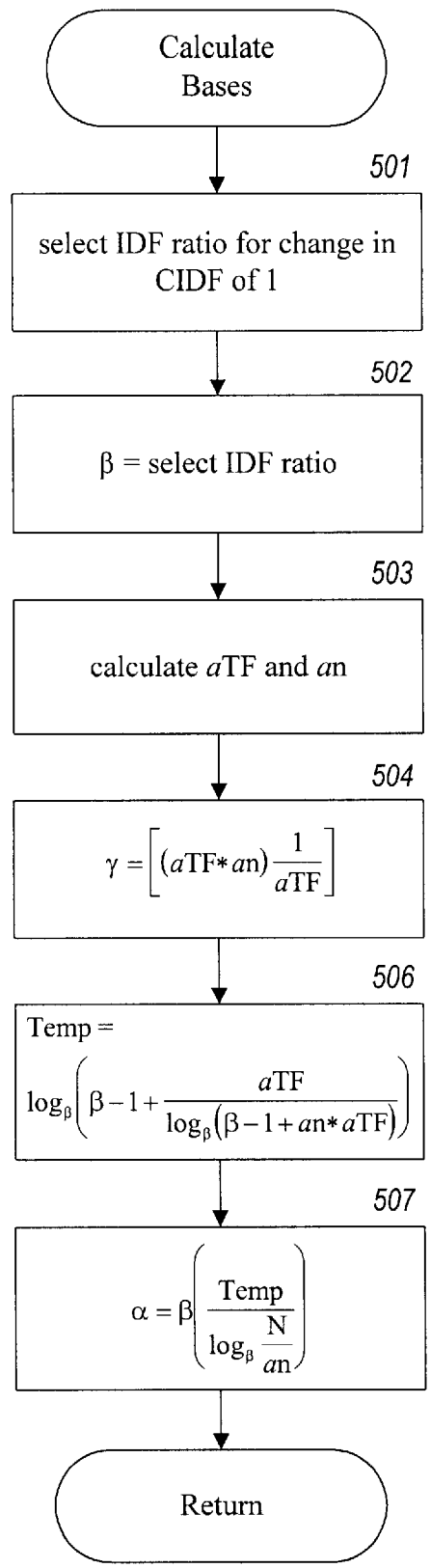
FIG. 5 is a flow diagram of a routine to calculate the bases for the weighting function.

FIG. 5 is a flow diagram of a routine to calculate the bases for the weighting function. In step 501, the routine selects the inverse document frequency ratio that will result in a change of 1 in the computed inverse document frequency. In one embodiment, this ratio is input to the weighting system. In step 502, the routine sets base $\beta$ equal to the selected inverse document frequency ratio. In step 503, the routine calculates the average term frequency and the average document frequency using equations (3.2) and (3.3). In step 504, the routine sets base $\gamma$ according to equation (7.4). In step 506 and 507, the routine sets the base $\alpha$ according to equation (6).

In an alternate embodiment, the weighting system calculates the weight of term i within documents using the following equation:

$$W_{ij} = \frac{\log_2(TF_{ij} + 1)}{\sum_{k=1}^{n_i} \log_2(TF_{ik} + 1)} \quad (8)$$

This equation is an entropy measure of the term frequency. This entropy measure has the desirable characteristics that the weight ranges from 0 to 1; that the sum of the weights of a term across all documents is 1; that if a term occurs in only one document, then its weight is 1; and that if a term occurs in all documents an equal number of times (e.g., "the" or "a"), then the weight for each document is 1/N.

Improved Calculation of Term Frequency

The count of the number of occurrences of a term within a document may not accurately reflect the importance of that term to the document. For example, as discussed above, documents accessible through the Internet often will contain a certain term many times so that search engines that use only the number of occurrences of a term as an indication of the importance of the term will retrieve that document in response to a search for that term. In many cases, that term may have little to do with the subject matter of the document. In one embodiment, the weighting system calculates an improved term frequency as a more accurate measure of the importance of a term to a document. The improved term frequency can be used in any weighting formula such as those described above. When generating the improved term frequency for a term within a document, the weighting system factors in the following:

1. The number of occurrences of the term in the document to (i.e., raw term frequency)—$TF_{Raw}$
2. The structures within the document in which the term occurs (e.g., abstract)—$C_{Structure}$
3. The formatting (e.g., bold, italics, highlight) of the term within the document—$C_{Format}$
4. The proximity of the term to the beginning of the document—$C_{ClosenessToTop}$
5. The distribution of the term among the sentences of the document—$C_{Distribution}$
6. The (inverse of) the number of unique terms in the document (i.e., vocabulary)—$C_{UniqueTermCount}$
7. The (inverse of) the total number of occurrences of all term within the documents—$C_{TotalTermCount}$
8. The strength of false promoting within the document—$C_{Spamming}$ The weighting system uses these factors when calculating the improved term frequency. In the following, an enhanced term frequency $TF_{Enhanced}$ and a adjusted term frequency $TF_{Adjusted}$ are described. Either the enhanced or the adjusted term frequency can be used as the improved term frequency.

When calculating the enhanced term frequency, the weighting system factors in the first five factors, which are characteristics of the term within the document independent of any other terms. For example, the format of the term is independent of any other terms in the document. The enhanced term frequency is defined by the following equations:

$$TF_{Enhanced} = TF_{Raw} * K2 * (1+K1) \tag{9.1}$$

$$K1 = \text{Base} * (C_{Structure} + C_{Format} + C_{ClosenessToTop}) \tag{9.2}$$

$$K2 = (1 + C_{Distribution}) \tag{9.3}$$

The factor Base is equal to the base γ of the normalizing term frequency function Γ. If the normalizing term frequency function is not logarithmic, then the factor Base is equal to 1. Thus, the factor Base compensates for whatever value of base γ is selected when a logarithmic function is used.

When calculating the adjusted term frequency, the weighting system factors in enhanced term frequency along with the last three factors, which are characteristics of other terms within the document. For example, the number of unique terms within a document is based on all terms within the document. The adjusted term frequency is defined by the following equations:

$$TF_{Adjusted} = TF_{Enhanced} * K3 * K4 \tag{10.1}$$

$$K3 = \frac{1}{\text{Log}_2\left(1 + \frac{C_{TotalTermCount}}{C_{UniqueTermCount}}\right)} \tag{10.2}$$

$$K4 = (1 - C_{SpamStrength}) \tag{10.3}$$

The ratio of total term count to the size of the vocabulary within a document is the average term frequency. As the average term frequency increases, then the significance of term frequency to the term-document importance decreases. That is, if the average term frequency is close to 1 (which is the minimum possible), then the term frequency should be a significant factor in the term-document importance. In contrast, if the average term frequency is very large, then the term frequency should not be a very significant factor to the term-document importance. Factor K3 represents the significance of the average term frequency as the inverse of its logarithm base 2. Thus, factor K3 varies between 0 and 1. If the average term frequency is 1, then factor K3 will be 1. As the average term frequency approaches infinity, the factor K3 approaches 0.

The constants $C_x$ that are used to calculate improved term frequency are described in the following. One skilled in the art will appreciate that various different definitions for the constants can be used as empirical evidence suggests different contributions of the various factors. Also, the definition of the enhanced and adjusted term frequency can be modified to factor in the empirical evidence.

$C_{Structure}$

The constant $C_{Structure}$ is defined for the structures of a hypertext markup language ("HTML") document. The table below gives sample values for the constant $C_{Structure}$ based on presence of the term in the URL for the document, the title of the document, the keyword section of the document, and the content of the document. The absence or presence in a structure is indicated by a "0" or "1." For example, when the term is present in the URL, keyword section, and content, but not in the title, the value of the constant $C_{Structure}$ 6. The value of constant $C_{Structure}$ varies between 0 and 8. One skilled in the art will appreciate that various other structures (e.g., abstract) of a document may be factored in when determining the value for constant $C_{Structure}$. Also, different weighting for the various structures can be used.

| URL | TITLE | KEYWORD | CONTENT | $C_{Structure}$ |
| --- | --- | --- | --- | --- |
| 0 | 0 | 0 | 1 | 0 |
| 0 | 0 | 1 | 0 | 1 |
| 0 | 0 | 1 | 1 | 3 |
| 0 | 1 | 0 | 0 | 2 |
| 0 | 1 | 0 | 1 | 3 |
| 0 | 1 | 1 | 0 | 3 |
| 0 | 1 | 1 | 1 | 5 |
| 1 | 0 | 0 | 0 | 3 |
| 1 | 0 | 0 | 1 | 4 |
| 1 | 0 | 1 | 0 | 4 |
| 1 | 0 | 1 | 1 | 6 |
| 1 | 1 | 0 | 0 | 5 |
| 1 | 1 | 0 | 1 | 6 |

-continued

| URL | TITLE | KEYWORD | CONTENT | $C_{Structure}$ |
|---|---|---|---|---|
| 1 | 1 | 1 | 0 | 6 |
| 1 | 1 | 1 | 1 | 8 |

$C_{Format}$

The constant $C_{Format}$ represents any emphasis (e.g., bold or italics) placed on the term within the document. The value of the constant $C_{Format}$ varies between 0 and 2. For example, if the term is italicized at every occurrence, then the value of the constant $C_{Format}$ may be 2. In contrast, if the term is italicized in 10% of its occurrences, then the value of the constant $C_{Format}$ may be 1.

$C_{ClosenessToTop}$

The constant $C_{ClosenessToTop}$ represents the proximity of the term to the beginning of the document. The constant $C_{ClosenessToTop}$ varies between 0 and 3. For example, if the term occurs in every one of the first 5% of the sentences in the document, then the value for constant $C_{ClosenessToTop}$ is 3. If, however, the term is not in any of the first 5% of the sentences, then the value of the constant $C_{ClosenessToTop}$ is 0.

$C_{SpamStrength}$

The constant $C_{SpamStrength}$ represents the strength of spamming, if any, that is detected in the document. The constant $C_{SpamStrength}$ varies between 0 and 1.

$C_{Distribution}$

The constant $C_{Distribution}$ represents the fraction of the sentences of the document in which the term occurs. The constant $C_{Distribution}$ is the total number of sentences in which the term occurs divided by the total number of sentences in the document. The constant $C_{Distribution}$ varies between 1/S to 1, where S is the number of sentences in the document.

$C_{UniqueTermCount}$

The constant $C_{UniqueTermCount}$ represents the number of unique terms in the document. The constant $C_{UniqueTermCount}$ varies between 1 and the number of occurrences of terms in the document.

$C_{TotalTermCount}$

The constant $C_{TotalTermCount}$ represents the total number of terms in the document.

The following table represents the minimum and maximum values for the raw, enhanced, and adjusted term frequencies.

| TF | MIN | MAX |
|---|---|---|
| $TF_{Raw}$ | 1 | $\infty$ |
| $TF_{Enhanced}$ | $TF_{Raw}$ | $2(1 + Base*13)*TF_{Raw}$ |
| $TF_{Adjusted}$ | $0*TF_{Enhanced}$ | $TF_{Enhanced}$ |

The enhanced term frequency has a minimum value of the raw term frequency when the constants $C_{Structure}$, $C_{Format}$, $C_{ClosenessToTop}$, and $C_{Distribution}$ each have a value of 0 and a maximum value when each of these constants are at their maximum value. The maximum value is $2*(1+Base*13)*TF_{Raw}$. The adjusted term frequency has its minimum value when the constants $C_{Spamming}$ and $C_{UniqueTermCount}$ are at their maximum value and when the constant $C_{TotalTermCount}$ is largest and has its maximum value when the constant $C_{Spamming}$ is at its maximum value and the constants $C_{TotalTermCount}$ and $C_{UniqueTermCount}$ are equal.

In an alternate embodiment, the weighting system may use a simple term frequency or a complete term frequency as the improved term frequency. The simple term frequency of a term is the number of times that the term is displayed when the document is displayed. Thus, the simple term frequency represents the occurrences of the term in visible portions of the document. In, for example, HTML documents, the visible portions of the document do not include comments, metadata fields, formatting tags, and so on. The complete term frequency of a term is the number of times that the term occurs anywhere in the document. In some calculations of the complete term frequency, the occurrences with HTML formatting tags are excluded.

In one embodiment, the weighting system stores with each document those terms of the document with the highest weights along with their weights. These terms are referred to as "smart words." For example, the weighting system may store up to 30 smart words in order based on their weights in a string-valued property of a document, referred to as the "SmartKeyWords" property. The weighting system may also store the corresponding weights of the smart words in the same order in another string-valued property, referred as the "SmartKeyWordWeights" property. The weighting system limits smart words to those terms that happen to occur in a minimum number of documents, for example, 10. This minimum number may be established based on the number of documents displayed as a result of a search. The minimum number helps prevent misspelled words from being "SmartWords".

Although the present invention has been described in terms of various embodiments, it is not intended that the invention be limited to these embodiments. Modifications within the spirit of the invention will be apparent to those skilled in the art. The scope of the present invention is defined by the claims that follow.

What is claimed is:

1. A method in a computer system for generating a weight for a term within one of a plurality of documents, the method comprising:

generating a term frequency that represents a number of times that the term occurs in the one document;

generating a total term frequency that represents a total number of times the term occurs in the plurality of documents;

calculating a normalized term frequency by factoring the generated term frequency by a normalizing function of the generated total term frequency, wherein the normalizing function substantially equalizes result of term frequency and reciprocal total term frequency on the weight of the term; and combining the calculated normalized term frequency with a document frequency to generate the weight for the term.

2. The method of claim 1 wherein the normalizing function comprises a reciprocal of a root of the generated total term frequency.

3. The method of claim 2 wherein the root is a square root.

4. The method of claim 2 wherein the root is a cube root.

5. The method of claim 1 wherein the normalizing function comprises a reciprocal of a power of the generated total term frequency.

6. The method of claim 5 wherein the power is between 0 and 1.

7. The method of claim 1 wherein the normalizing function comprises a reciprocal of a logarithm of the generated total term frequency.

8. The method of claim 1 wherein the combining of the calculated normalized term frequency with a document frequency multiplies a logarithm of the calculated normalized term frequency by a logarithm of the document frequency.

9. The method of claim 8 wherein bases of the logarithms are different.

10. The method of claim 8 wherein bases of the logarithms are calculated so that on average the logarithms of the calculated normalized term frequency and the logarithms of the document frequency are equal.

11. The method of claim 8 wherein $$\alpha = \left| \beta^{\left( \frac{\log_\beta(1+aTF)}{\log_\beta \frac{N}{an}} \right)} \right|$$

where $\alpha$ s the base of the logarithm of the calculated normalized term frequency, where $\beta$ is the base of the logarithm of the document frequency, where aTF is an average of the term frequencies for each term, where N is the number of documents, and where an is an average of the number of documents in which each term is contained.

12. The method of claim 8 wherein $$\alpha = \left| \beta^{\left( \frac{\log_\beta(\beta-1+aTF*(an*aTF)^{-1/2})}{\log_\beta \frac{N}{an}} \right)} \right|$$

where $\alpha$ is the base of the logarithm of the calculated normalized term frequency, where $\beta$ is the base of the logarithm of the document frequency, where aTF is an average of the term frequencies for each term, where N is the number of documents, and where an is an average of the number of documents in which each term is contained.

13. The method of claim 8 wherein $$\alpha = \left| \beta^{\left( \frac{\log_\beta(\beta-1+aTF*\log_\gamma(\gamma-1+an*aTF)^{-1})}{\log_\beta \frac{N}{an}} \right)} \right|$$

where $\alpha$ is the base of the logarithm of the calculated normalized term frequency, where $\beta$ is the base of the logarithm of the document frequency, where $\gamma$ is the base of the logarithm for normalizing the term frequency, where aTF is an average of the term frequencies for each term, where N is the number of documents, and where an is an average of the number of documents in which each term is contained.

14. The method of claim 1 wherein the generated term frequency is an improved term frequency.

15. The method of claim 1 wherein the generated term frequency is enhanced based on factors that are independent of other terms in the document.

16. The method of claim 1 wherein the generated term frequency is adjusted based on factors related to the term and factors related to other terms in the document.

17. A computer-readable medium containing computer-readable instructions for performing the method of claim 1.

18. A method in a computer system for selecting a formula for weighting terms within one of a plurality of documents, the method comprising:

generating an average term frequency that represents an average of term frequencies for at least one of a plurality of terms within each document, the term frequency being the number of times that a term occurs in a document;

generating an average inverse document frequency that represents an average of inverse document frequencies for the at least one of a plurality of terms, the inverse document frequency of the term being the number of documents divided by the number of documents in which the term occurs; and selecting a first function and a second function so that the result of the first function of the generated average term frequency is approximately equal to the result of the second function of the generated average inverse document frequency.

19. The method of claim 18 wherein the first and second functions are a logarithmic functions and the identifying of the functions includes calculating a first base for a logarithm and a second base for a logarithm so that the logarithm of the first base of the generated average term frequency is approximately equal to the logarithm of the second base of the generated average inverse document frequency.

20. The method of claim 19 wherein the calculating of the second base calculates the second base to be equal to a multiplication factor by which a change in the generated average inverse document frequency results in a change of one in the logarithm of the second base of the generated average inverse document frequency.

21. The method of claim 19 wherein $$\alpha = \left| \beta^{\left( \frac{\log_\beta(1+aTF)}{\log_\beta \frac{N}{an}} \right)} \right|$$

where $\alpha$ is the first base, where $\beta$ is the second base, where aTF is an average of the term frequencies for each term, where N is the number of documents, and where an is an average of the number of documents in which each term is contained.

22. The method of claim 19 wherein $$\alpha = \left| \beta^{\left( \frac{\log_\beta(\beta-1+aTF*(an*aTF)^{-1/2})}{\log_\beta \frac{N}{an}} \right)} \right|$$

where $\alpha$ is the first base, where $\beta$ is the second base, where aTF is an average of the term frequencies for each term, where N is the number of documents, and where an is an average of the number of documents in which each term is contained.

23. The method of claim 19 wherein $$\alpha = \left| \beta^{\left( \frac{\log_\beta(\beta-1+aTF*\log_\gamma(\gamma-1+an*aTF)^{-1})}{\log_\beta \frac{N}{an}} \right)} \right|$$

where $\alpha$ is the first base, where $\beta$ is the second base, where $\gamma$ is the base of the logarithm for normalizing the term frequency, where aTF is an average of the term frequencies for each term, where N is the number of documents, and where an is an average of the number of documents in which each term is contained.

24. The method of claim 18 wherein the generated term frequency is an improved term frequency.

25. The method of claim 18 wherein the generated term frequency is enhanced based on factors that are independent of other terms in the document.

26. The method of claim 18 wherein the generated term frequency is adjusted based on factors related to the term and factors related to other terms in the document.

27. A system for generating a weight for a term within one of a plurality of documents, the system comprising:

a first term frequency generator that computes a number of times that the term occurs in the one of the plurality of documents;

a second term frequency generator that computes a total number of times the term occurs in the plurality of documents;

a normalizer that calculates a normalized term frequency by factoring the number of times that the term occurs in the one of the plurality of documents by a normalizing function of the total number of times the term occurs in the plurality of documents, the normalizing function substantially equalizing the result of term frequency and reciprocal total term frequency on the weight of the term; and a combiner that combines the calculated normalized term frequency with a document frequency to generate the weight for the term.

* * * * *